United States Patent
Geuens

(10) Patent No.: US 11,874,374 B2
(45) Date of Patent: Jan. 16, 2024

(54) SYSTEM FOR CHARACTERIZING SURROUNDINGS OF A VEHICLE

(71) Applicant: XENOMATIX NV, Leuven (BE)

(72) Inventor: Filip Geuens, Holsbeek (BE)

(73) Assignee: Xenomatix NV, Leuven (BE)

(*) Notice: Subject to any disclaimer, the term of this patent is extended or adjusted under 35 U.S.C. 154(b) by 1081 days.

(21) Appl. No.: 16/461,207

(22) PCT Filed: Jan. 2, 2018

(86) PCT No.: PCT/EP2018/050080
§ 371 (c)(1),
(2) Date: May 15, 2019

(87) PCT Pub. No.: WO2018/122415
PCT Pub. Date: Jul. 5, 2018

(65) Prior Publication Data
US 2019/0310376 A1      Oct. 10, 2019

(30) Foreign Application Priority Data
Dec. 30, 2016   (EP) .................................... 16207630

(51) Int. Cl.
*G01S 17/18*      (2020.01)
*G01S 7/481*     (2006.01)
(Continued)

(52) U.S. Cl.
CPC ............ *G01S 17/18* (2020.01); *G01S 7/4815* (2013.01); *G01S 7/4868* (2013.01); *G01S 17/894* (2020.01); *G01S 17/931* (2020.01)

(58) Field of Classification Search
CPC ........ G01S 17/18; G01S 17/894; G01S 17/89; G01S 7/4868
See application file for complete search history.

(56) References Cited

U.S. PATENT DOCUMENTS

| | | | |
|---|---|---|---|
| 9,076,703 B2 * | 7/2015 | Bishay | H04N 5/2258 |
| 2004/0008394 A1 | 1/2004 | Lange et al. | |

(Continued)

FOREIGN PATENT DOCUMENTS

| | | |
|---|---|---|
| EP | 2 290 393 A2 | 3/2011 |
| EP | 2 290 402 A1 | 3/2011 |

(Continued)

OTHER PUBLICATIONS

European Search Report dated Jul. 21, 2017 in the priority application EP 16 20 7630.1. 9 pages.
(Continued)

*Primary Examiner* — Luke D Ratcliffe
(74) *Attorney, Agent, or Firm* — Polsinelli PC

(57) ABSTRACT

The invention pertains to a system for characterizing surroundings of a vehicle, the system comprising: projection means (210) arranged for projecting a pattern of laser light towards said surroundings in a sequence of pulses; a detector (220) comprising a plurality of pixels, said detector (220) being configured for detecting light representing said pattern of laser light as reflected by said surroundings in synchronization with said sequence of pulses; and processing means (240) configured to calculate distances to objects (99) in said surroundings as a function of exposure values generated by said pixels in response to said detected light; wherein said detector (220) is further configured for detecting light forming a two-dimensional image of said surroundings at points in time that do not coincide with said sequence of pulses or at pixels that do not receive said light representing said pattern of laser light as reflected by said surroundings.

19 Claims, 7 Drawing Sheets

(51) Int. Cl.
*G01S 7/486* (2020.01)
*G01S 17/931* (2020.01)
*G01S 17/894* (2020.01)

(56) References Cited

U.S. PATENT DOCUMENTS

| | | |
|---|---|---|
| 2004/0041077 A1 | 3/2004 | Fossum |
| 2005/0145773 A1 | 7/2005 | Hashimoto et al. |
| 2007/0158770 A1 | 7/2007 | Kawahito |
| 2007/0177011 A1 | 8/2007 | Lewin et al. |
| 2007/0177841 A1 | 8/2007 | Danziger |
| 2010/0194942 A1 | 8/2010 | Wada |
| 2010/0231891 A1 | 9/2010 | Mase et al. |
| 2012/0038903 A1 | 2/2012 | Weimer et al. |
| 2012/0200841 A1 | 8/2012 | Kamiyama et al. |
| 2013/0148102 A1 | 6/2013 | Oggier |
| 2014/0253758 A1 | 9/2014 | Metz |
| 2015/0144790 A1 | 5/2015 | Velichko et al. |
| 2015/0163474 A1 | 6/2015 | You et al. |
| 2015/0253429 A1 | 9/2015 | Dorrington et al. |
| 2015/0260830 A1 | 9/2015 | Ghosh et al. |
| 2015/0292884 A1* | 10/2015 | Fuchikami ............ H04N 5/2256 348/135 |
| 2015/0319347 A1 | 11/2015 | Cottrell |
| 2015/0341573 A1 | 11/2015 | Matsuo et al. |
| 2016/0259057 A1 | 9/2016 | Ito |
| 2016/0266255 A1 | 9/2016 | Nishikawa et al. |
| 2016/0295133 A1 | 10/2016 | Rudmann et al. |
| 2016/0349043 A1* | 12/2016 | Lee ........................ G01B 11/22 |
| 2017/0068319 A1* | 3/2017 | Viswanathan ........ G01S 7/4817 |
| 2018/0045513 A1 | 2/2018 | Kitamura et al. |
| 2018/0053799 A1 | 2/2018 | Otani et al. |
| 2018/0106606 A1 | 4/2018 | Fujita et al. |
| 2018/0259647 A1 | 9/2018 | Takano et al. |

FOREIGN PATENT DOCUMENTS

| | | |
|---|---|---|
| EP | 2 322 953 A1 | 5/2011 |
| EP | 2 634 595 A1 | 9/2013 |
| EP | 3 159 711 A1 | 4/2017 |
| JP | 07-49417 A | 2/1995 |
| JP | 2002-139304 A | 5/2002 |
| JP | 2002526989 A | 8/2002 |
| JP | 2003185412 A | 7/2003 |
| JP | 2004-104259 A | 4/2004 |
| JP | 2004-126588 A | 4/2004 |
| JP | 2004529343 A | 9/2004 |
| JP | 2005-159314 A | 6/2005 |
| JP | 2010181171 A | 8/2010 |
| JP | 2010-219826 A | 9/2010 |
| JP | 2010190675 A | 9/2010 |
| JP | 2011-128024 A | 6/2011 |
| JP | 2016-027646 A | 2/2016 |
| JP | 2016-166814 A | 9/2016 |
| WO | 2000019705 A1 | 4/2000 |
| WO | 2002082201 A1 | 10/2002 |
| WO | 2004/012269 A1 | 2/2004 |
| WO | 2014/122714 A1 | 8/2014 |
| WO | 2015/004213 A1 | 1/2015 |
| WO | 2015/162278 A1 | 10/2015 |
| WO | 2016/020073 A1 | 2/2016 |
| WO | 2016/076796 A1 | 5/2016 |
| WO | 2016199323 A1 | 12/2016 |
| WO | 2015/075926 A1 | 3/2017 |

OTHER PUBLICATIONS

International Search Report dated Apr. 19, 2018 in the parent application PCT/EP2018/050080. 4 pages.
International Preliminary Report on Patentability dated Nov. 30, 2018 in the parent application PCT/EP2018/050080. 10 pages.
Anon, "Laser Range-Gated Imaging for Imaging at Long Ranges and Through Obscurants (Fog, Smoke, Mist, Haze, Rain)", Jun. 9, 2018, 5 pages.
Büttgen et al., "Pseudonoise Optical Modulation for Real-Time 3-D Imaging With Minimum Interference", IEEE Transactions on Circuits and Systems-I: Regular Papers, vol. 54, No. 10, Oct. 2007, pp. 2109-2119.
Huang et al., "Monolithic Integrated Piezoelectric MEMS-Tunable VCSEL", IEEE Journal of Selected Topics in Quantum Electronics, vol. 13, No. 2, Mar./Apr. 2007, pp. 374-380.
Kawahito et al., "A CMOS Time-of-Flight Range Image Sensor With Gates-on-Field-Oxide Structure", IEEE Sensors Journal, vol. 7, No. 12, Dec. 2007, pp. 1578-1586.
Stoppa et al., "An 80×60 Range Image Sensor Based on 10 μm 50 MHz Lock-In Pixels in 0.18 μm CMOS", ISSCC 2010/Session 22/Image Sensors/22.7, 2010 IEEE International Solid-State Circuits Conference, pp. 406-407.
Satoh et al., "Development of an Intelligent Wheelchair based on Stereo-vision Camera coupled with a Near-infrared Pattern Projector", Information Technology Research Institute, National Institute of Advanced Industrial Science and Technology (AIST), IEICE Technical Report, Oct. 23, 2008, (pp. 103-106) w/English Abstract.
Japanese Office Action dated Jun. 2, 2021 issued in corresponding Patent Application No. 2019-538731 w/English Translation (10 pages).
Office Action dated Aug. 18, 2023 for corresponding Japan Application No. 2022-205238 (7 pages).

* cited by examiner

SYSTEM FOR CHARACTERIZING SURROUNDINGS OF A VEHICLE

CROSS REFERENCE TO RELATED APPLICATIONS

This application is a National Phase filing under 35 U.S.C. § 371 of PCT/EP2018/050080, entitled "SYSTEM FOR CHARACTERIZING SURROUNDINGS OF A VEHICLE" filed on Jan. 2, 2018, and claims priority to European Patent Application No. EP 16207630.1, entitled "SYSTEM FOR CHARACTERIZING SURROUNDINGS OF A VEHICLE" filed on Dec. 30, 2016. The entire contents of each application are hereby incorporated by reference in their entireties.

FIELD OF THE INVENTION

The present invention pertains to the field of systems for determining a distance to an object, in particular to sensing systems to be used for the characterization of a scene or a part thereof, as may be used to detect obstacles in the vicinity of a vehicle.

BACKGROUND

In the field of remote sensing technology, in particular with regard to the generation of high-resolution maps of a scenery which can be used in control and navigation applications including automotive and industrial applications, gaming applications, and mapping applications, it is known to use triangulation-based and time-of-flight based sensing to determine the distance of objects from a sensor.

A high-accuracy medium-range surround sensing system for vehicles that makes use of triangulation, is known from international patent application publication WO 2015/004213 A1 in the name of the present applicant. In that patent application, the localization of objects is based on the projection of pulsed radiation spots and the analysis of the displacement of detected spots with reference to predetermined reference spot positions. More in particular, the system of the cited patent application uses triangulation. However, the accuracy that can be achieved correlates with the triangulation base, which limits the miniaturization that can be achieved.

Time-of-flight based techniques include the use of RF modulated sources, range gated imagers, and direct time-of-flight (DToF) imagers. For the use of RF modulated sources and range gated imagers, it is necessary to illuminate the entire scene of interest with a modulated or pulsed source. Direct time-of-flight systems, such as most LIDARs, mechanically scan the area of interest with a pulsed beam, the reflection of which is sensed with a pulse detector. The optical power emitted by present semiconductor lasers cannot meet the power requirements necessary for operations in the known LIDAR systems to be of practical use in automotive applications (e.g. for ranges up to 250 m). Unpublished European patent application no. EP 15 191 288.8, in the name of the present applicant, describes a system for determining a distance to an object that overcomes such limitations. It comprises: a solid-state light source arranged for projecting a pattern of discrete spots of laser light towards the object in a sequence of pulses; a detector comprising a plurality of pixels, the detector being configured for detecting light representing the pattern of discrete spots as reflected by the object in synchronization with said sequence of pulses; and processing means configured to calculate the distance to the object as a function of exposure values generated by said pixels in response to said detected light. The pixels are configured to generate said exposure values by accumulating, for each pulse of said sequence, a first amount of electrical charge representative of a first amount of light reflected by said object during a first predetermined time window and a second electrical charge representative of a second amount of light reflected by said object during a second predetermined time window, said second predetermined time window occurring after said first predetermined time window.

As remote sensing technology is increasingly being relied on to provide vehicle-safety features, advanced driver assistance systems (ADAS), and even autonomous (or "self-driving") cars, there is a need for a system that more accurately characterize the surroundings of the vehicle in which the system is mounted.

SUMMARY OF THE INVENTION

According to an aspect of the present invention, there is provided a system for characterizing surroundings of a vehicle, the system comprising:
- a projection means arranged for projecting a pattern of laser light towards said surroundings in a sequence of pulses, said pattern of laser light comprising a pattern of discrete spots;
- a detector comprising a plurality of pixels, said detector being configured for detecting light representing said pattern of laser light as reflected by said surroundings in synchronization with said sequence of pulses; and
- processing means configured to calculate distances to objects in said surroundings as a function of exposure values generated by said pixels in response to said detected light;

wherein said detector is further configured for detecting light forming a two-dimensional image of said surroundings at points in time that do not coincide with said sequence of pulses or at pixels that do not receive said light representing said pattern of laser light as reflected by said surroundings.

It is an advantage of the invention that the characterization of the surroundings can be improved by combining 2D information and 3D information obtained from the same sensor at interleaved points in time. The 3D information is obtained from the system when used as a range sensor, by capturing the reflected light patterns in synchronization with their projection; and the 2D information is obtained from the system when used as a digital camera between the range sensing pulses.

The projection means preferably comprises a solid-state laser; it could in particular be a VCSEL array or a solid-state laser provided with an adequate grating. The pattern of laser light is preferably a pattern of spots, in particular discrete spots. The sequence of pulses may be periodically repeated, to allow for a continuous updating of the characterization of the surroundings.

In an embodiment of the system according to the present invention, the pixels are configured to generate said exposure values by accumulating, for all of the pulses of said sequence, a first amount of electrical charge representative of a first amount of light reflected by said objects during a first predetermined time window and a second electrical charge representative of a second amount of light reflected by said objects during a second predetermined time window, said second predetermined time window occurring after said first predetermined time window.

It is an advantage of this embodiment that it uses range-gated LIDAR techniques to obtain accurate distance information in a small form factor.

In an embodiment of the system according to the present invention, said processing means are adapted to determine said distances by determining a displacement of features of said detected light representing said pattern of laser light as reflected by said surroundings with reference to predetermined feature positions.

In this embodiment, the respective exposure values of the different pixels of the detector are analyzed to determine in which pixels reflections of the projected pattern (e.g. spots) are detectable, and in which they are not. In this manner, the displacement of parts of the reflected pattern relative to predetermined positions (e.g. spot positions) can be determined, which yields information about the distance of the objects that have reflected the respective parts of the projected pattern. It is an advantage of this embodiment that it uses familiar triangulation-based techniques to obtain accurate distance information.

In an embodiment, the system according to the present invention comprises illumination means configured to project a bundle of light onto said surroundings at said points in time that do not coincide with said sequence of pulses.

The bundle of light is intended for a homogeneous illumination of the relevant part of the surroundings, preferably coinciding with the field of view of the detector, so, unlike the projected pattern used for ranging, it must be substantially homogeneous. It is an advantage of this embodiment, that the scenery to be captured in the 2D image can be adequately lit, even when the ambient light conditions are unfavorable (e.g., at night).

In a particular embodiment, the projection means and the illumination means share a common light source.

It is an advantage of this particular embodiment, that the system can be kept compact by avoiding the need for multiple light sources.

In a more particular embodiment, the common light source comprises a VCSEL array, and the illumination means further comprises an actively steered diffuser, configured to be activated at said points in time that do not coincide with said sequence of pulses, so as to diffuse light originating from the VCSEL array to form the bundle.

It is an advantage of this more particular embodiment, that a VCSEL array, which is well suited for projection of structured light, can also be used to provide the illumination required for 2D image capturing.

In an embodiment of the system according to the present invention, the plurality of pixels of the detector are provided with a time-dependent filter allowing light in different wavelength bands to reach the plurality of pixels at different ones of said points in time.

It is an advantage of this embodiment that an RGB image can be produced by combining three different 2D exposures that are slightly offset in time. An RGB image yields more accurate automated feature recognition and is generally more suited for visual reproduction to a human user than a monochrome image.

In an embodiment of the system according to the present invention, the different pixels of the plurality of pixels of the detector are provided with different filters allowing light in different wavelength bands to reach the different pixels at said points in time.

It is an advantage of this embodiment that an RGB image can be produced by combining exposure values that are obtained at pixels that are slightly offset in space. An RGB image yields more accurate automated feature recognition and is generally more suited for visual reproduction to a human user than a monochrome image.

According to an aspect of the present invention, there is provided a vehicle comprising the system according to any of the preceding claims arranged so as to characterize an area surrounding said vehicle.

The present invention is well suited for use in vehicles, in particular road vehicles such as automobiles. The system may thus advantageously contribute to vehicle-safety features, advanced driver assistance systems (ADAS), and even autonomous (or "self-driving") cars. As sensors in automotive applications are competing for space, it is an additional advantage of the present invention that it combines multiple functions in the same sensor, thus providing 2D and 3D sensor fusion without requiring an additional external 2D sensor.

BRIEF DESCRIPTION OF THE FIGURES

These and other aspects and advantages of the present invention will now be described in more detail with reference to the accompanying drawings, in which.

DETAILED DESCRIPTION OF EMBODIMENTS

Figure 1:
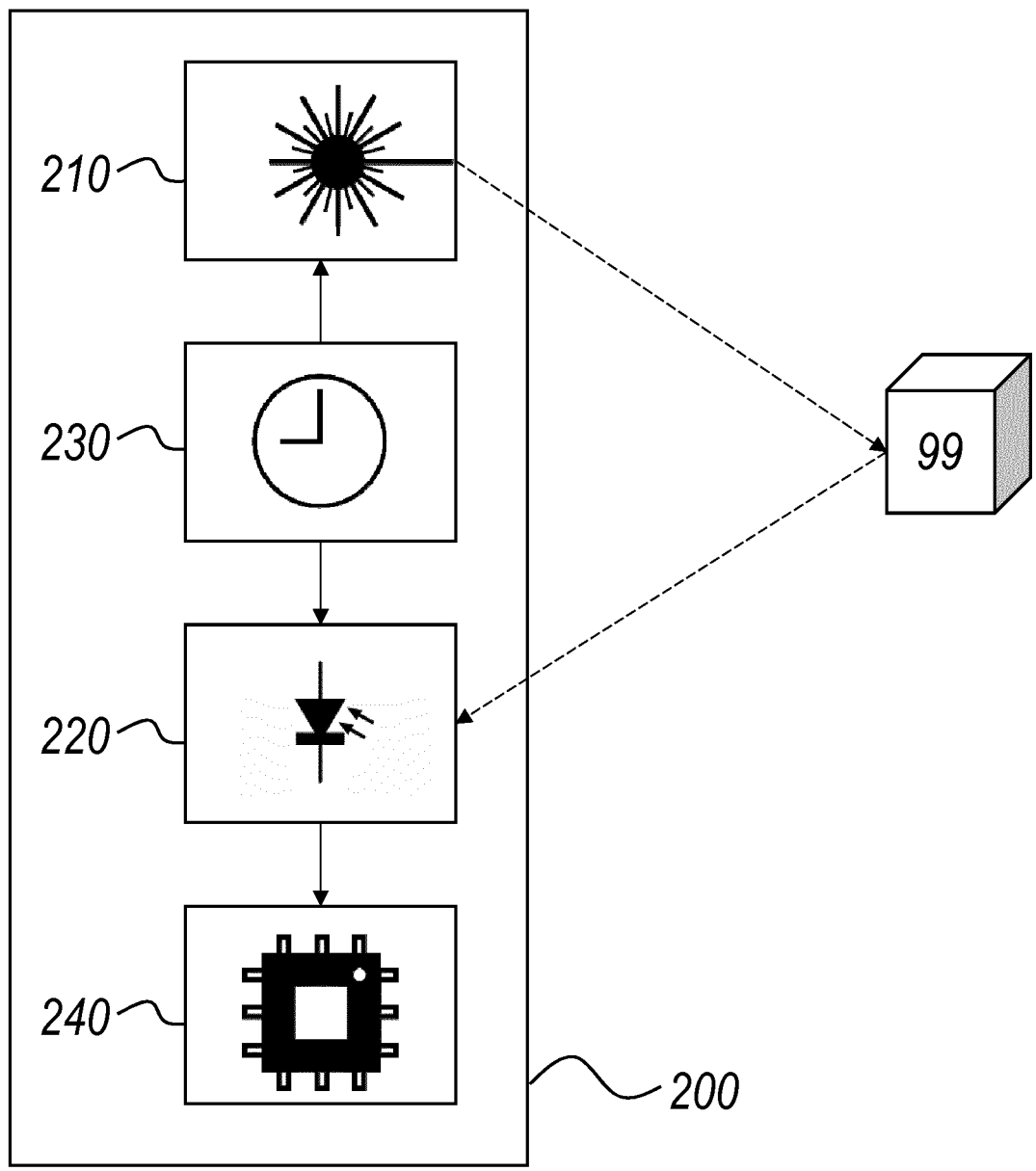
FIG. 1 schematically illustrates an embodiment of the system according to the present invention.

FIG. 1 schematically illustrates an embodiment of the system according to the present invention.

The system is intended and adapted for characterizing surroundings of a vehicle. The surroundings may include the area in front of the vehicle, including the road surface ahead of the vehicle; likewise, it may include the area behind the vehicle (in particular, when the vehicle is reversing); it may include any space in the vicinity of the vehicle where obstacles or other road users may be present. The surroundings of the vehicle may extend to a distance of meters, tens of meters, or even hundreds of meters. The characterization is performed by determining distances to objects in the surroundings. While distance is a fundamental measurement parameter, estimates of derived variables such as velocity (including direction of motion) and acceleration of the detected objects may be determined on the basis of multiple distance measurements at different points in time. For complex objects, which may be recognized by combining information from multiple spatially diverse measurement points, additional parameters such as orientation and rotation may also be derived. As all measurements are relative to the sensor, measurements of "fixed" objects may also provide information about the velocity, acceleration, orientation (pitch, yaw, roll), and rotation of the sensor, and thus of the vehicle onto which it is mounted.

The system comprises projection means 210 arranged for projecting a pattern of laser light towards the surroundings in a sequence of pulses; a detector 220 comprising a plurality of pixels, the detector 220 being configured for detecting light representing the pattern of laser light as reflected by the surroundings in synchronization with the sequence of pulses; and processing means 240 configured to calculate distances to objects 99 in the surroundings as a function of exposure values generated by the pixels in response to the detected light.

If the system works according to the time-of-flight (LIDAR) principle, the pixels 220 may be configured to generate the exposure values by accumulating, for all of the pulses of the sequence, a first amount of electrical charge representative of a first amount of light reflected by the objects 99 during a first predetermined time window 10 and a second electrical charge representative of a second amount of light reflected by the objects during a second predetermined time window 20, the second predetermined time window 20 occurring after the first predetermined time window 10.

Figure 2:
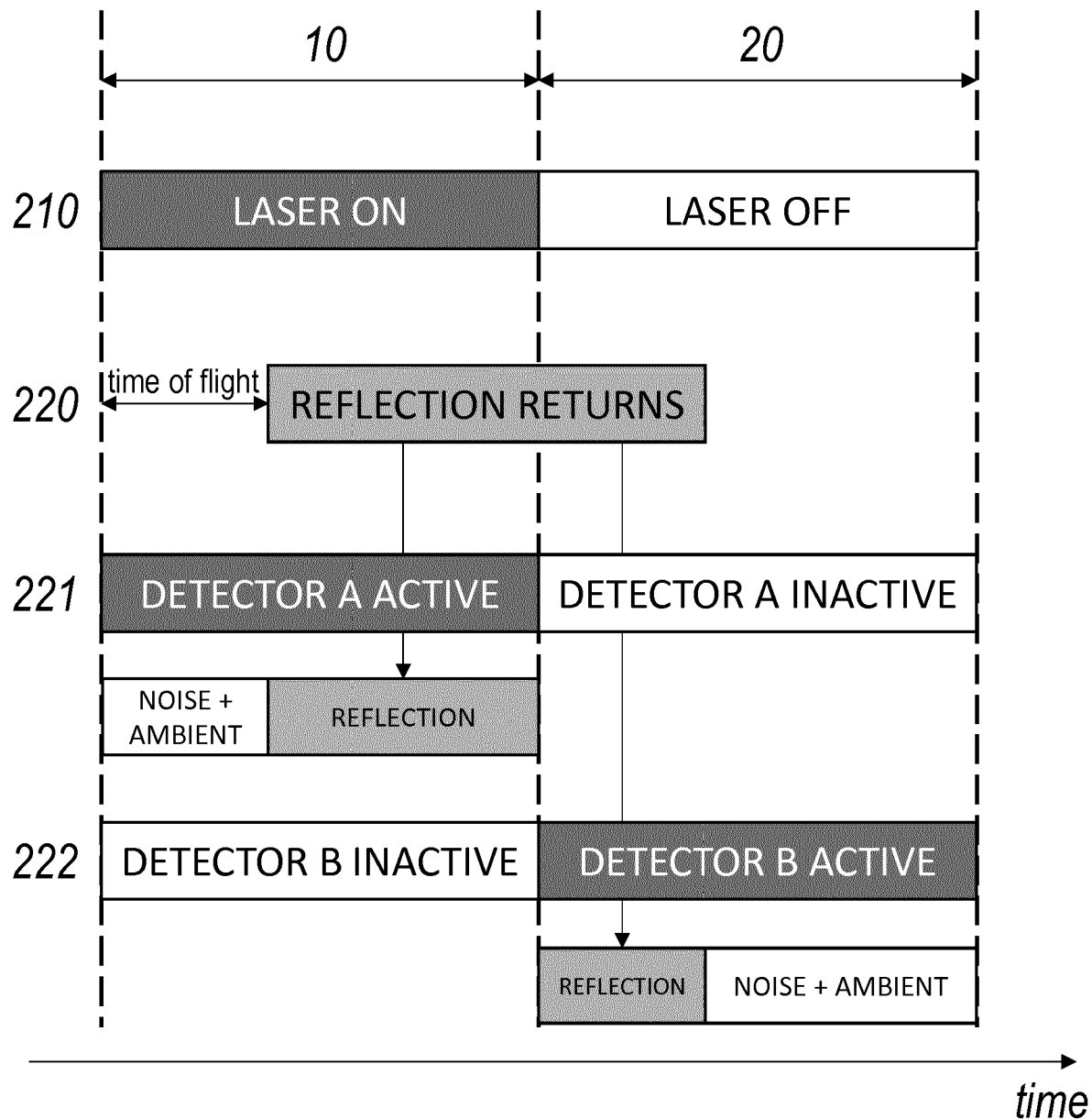
FIGS. 2-4 illustrate the operating principles of a LIDAR-based embodiment of the system according to the present invention.
Figure 3:
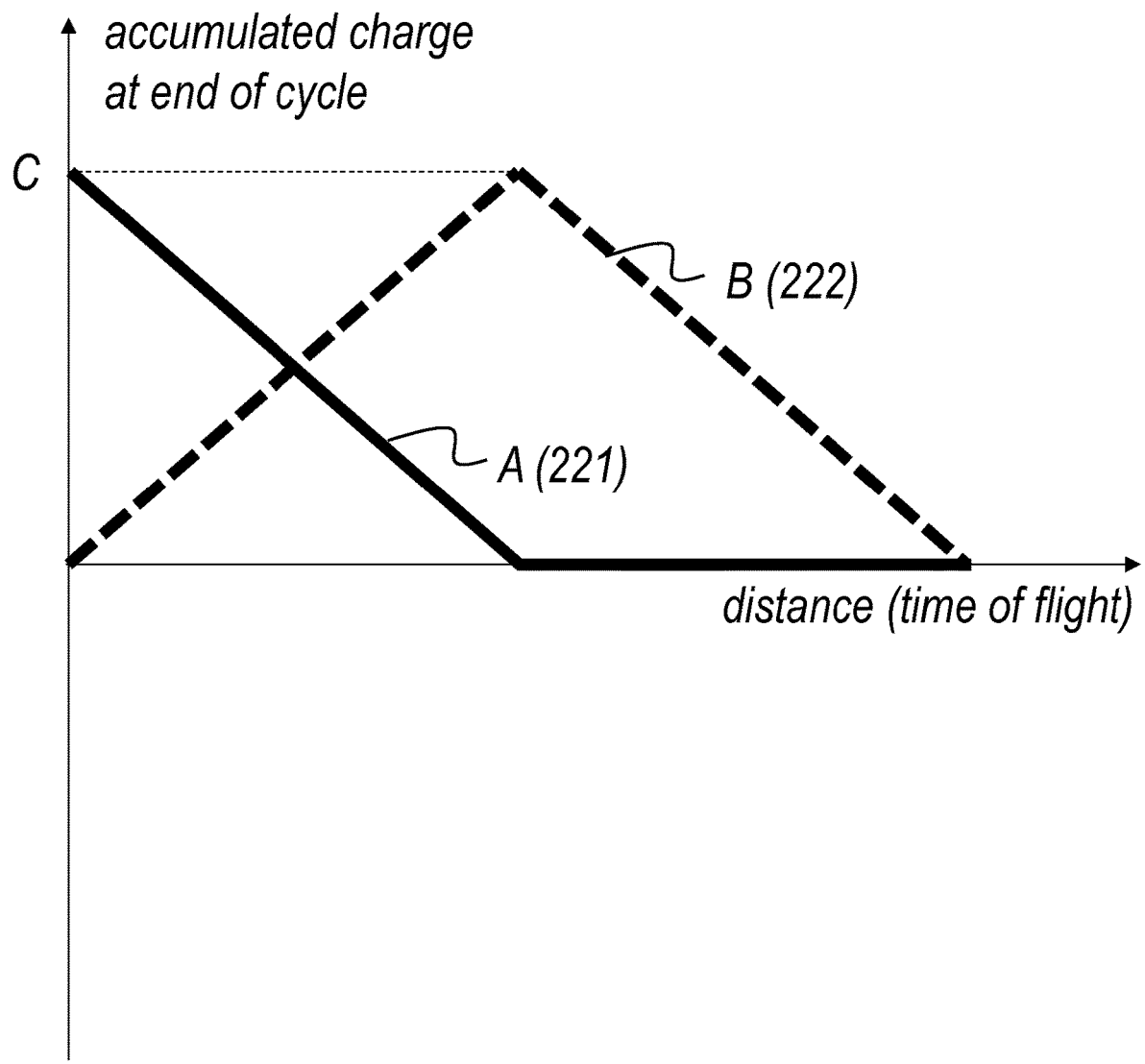
Figure 4:
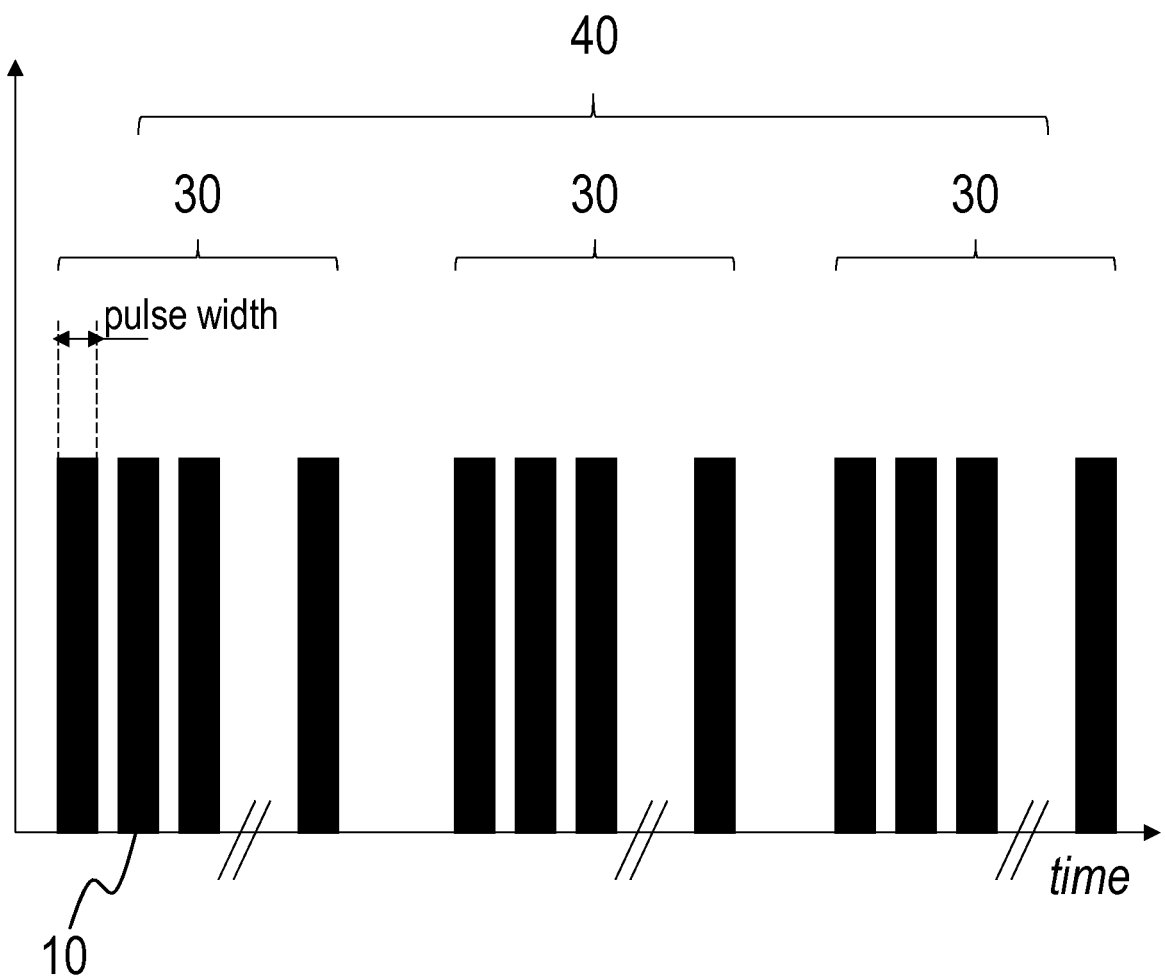

The operating principle of such a LIDAR-based system is illustrated by the timing diagrams in FIGS. 2-4. For clarity reasons, only a single pulse of the pulse sequence which is repeated periodically is illustrated, which consists of a first time window 10 and a second time window 20. The principle is described, by way of example, with reference to a projection means comprising a solid-state light source.

As can be seen in FIG. 2, during the first time window 10, the solid-state light source 210 is in its "ON" state, emitting the pattern of light spots onto the scenery. During the second time window 20, the solid-state light source 210 is in its "OFF" state.

The arrival of the reflected light at the detector 220 is delayed relative to the start of the projection by an amount of time that is proportional to the distance travelled (approximately 3.3 ns/m in free space). Due to this delay, only a part of the reflected light will be detected at the first well 221 of the detector 220, which is only activated during the first time window 10. Thus, the charge accumulated in this first well during its period of activation (the first time window 10) consists of a part representing only the noise and the ambient light impinging on the pixel prior to the arrival of the reflected pulse, and a part representing the noise, the ambient light, and the leading edge of the reflected pulse.

The latter part of the reflected pulse will be detected at the second well 222 of the detector 220, which is only activated during the second time window 20, which preferably immediately follows the first time window 10. Thus, the charge accumulated in this second well during its period of activation (the second time window 20) consists of a part representing the noise, the ambient light, and the trailing edge of the reflected pulse, and a part representing only the noise and the ambient light impinging on the pixel after the arrival of the reflected pulse.

The greater the distance between the reflecting object 99 and the system 200, the smaller the proportion of the pulse that will be detected in the first well 221 and the larger the proportion of the pulse that will be detected in the second well 222.

If the leading edge of the reflected pulse arrives after the closing of the first well 221 (i.e., after the end of the first time window 10), the proportion of the reflected pulse that can be detected in the second well 222 will decrease again with increasing time of flight delay.

The resulting amounts of charge A, B in each of the respective wells 221, 222 for varying distances of the object 99 is shown in FIG. 3b. To simplify the representation, the effect of the attenuation of light with distance, according to the inverse square law, has not been taken into account in the diagram. It is clear that for time of flight delays up to the combined duration of the first time window 10 and the second time window 20, the time of flight delay can in principle unambiguously be derived from the values of A and B:

For time of flight delays up to the duration of the first time window 10, B is proportional to the distance of the object 99. To easily arrive at a determination of the absolute distance, the normalized value B/(B+A) may be used, removing any impact of non-perfect reflectivity of the detected object and of the inverse square law.

For time of flight delays exceeding the duration of the first time window 10, A consists of daylight and noise contributions only (not illustrated), and C−B is substantially proportional (after correcting for the inverse square law) to the distance of the object 99, where C is an offset value.

While FIGS. 2 and 3 illustrate the principle of the invention in relation to a single pulse emitted in the time window 10, it shall be understood that the illustrated pulse is part of a sequence of pulses as defined above. FIG. 4 schematically illustrates exemplary timing characteristics of such a sequence. As illustrated, the illumination scheme 40 consists of a repeated emission of a sequence 30 of individual pulses 10. The width of the individual pulses 10 is determined by the maximal operating range. The entire sequence may be repeated at a frequency of, for example, 60 Hz.

Various optional features of a time-of-flight based sensing system are described in unpublished European patent application no. EP 15 191 288.8, in the name of the present applicant, the contents of which are incorporated by this reference for the purpose of enabling the skilled person to include these features in embodiments of the present invention.

If the system works according to the triangulation principle, the processing means 240 may be adapted to determine the distances by determining a displacement of features of the detected light representing the pattern of laser light as reflected by the surroundings with reference to predetermined feature positions. Preferably, the projected pattern is a pattern of spots of laser light, and the distances are determined by determining a displacement of detected spots that represent the projected spots as reflected by objects in the surroundings, with reference to predetermined spot positions.

Various optional features of a triangulation based sensing system are disclosed in international patent application publication WO 2015/004213 A1 in the name of the present applicant, the contents of which are incorporated by this reference for the purpose of enabling the skilled person to include these features in embodiments of the present invention.

According to the invention, the detector 220 is further configured for detecting light forming a two-dimensional image of the surroundings at points in time that do not coincide with the sequence of pulses or at pixels that do not receive said light representing said pattern of laser light as reflected by said surroundings.

In view of the accuracy requirements of vehicular ranging systems, CMOS sensor arrays having a total array size in the order of 1 megapixel are typically selected. The inventors have found that despite the relatively coarse size of the pixels used in such sensors, in the order of 10 μm, the combined sensor is capable of yielding a surprisingly acceptable 2D image quality when used in combination with adequate optics to form a rudimentary digital camera.

The invention, and in particular the concept of detecting light forming a two-dimensional image of the surroundings at points in time that do not coincide with the sequence of pulses, is based inter alia on the insight of the inventors that in the time intervals between the ranging pulses, or between sequences of ranging pulses, the pixel array may be used to capture digital 2D images of the surroundings. In this way, two different functions, which provide complementary information, may be combined in a single sensor.

The invention, and in particular the concept of detecting light forming a two-dimensional image of the surroundings at pixels that do not receive said light representing said pattern of laser light as reflected by said surroundings, is further based on the insight of the inventors that as ranging systems rely on the detection of reflections of specific light patterns, such as line patterns or spot patterns, only a small subset of the total number of pixels is actually being used at any given time. This specific concept may be used when sufficient ambient light reaches the detector when the ranging function (projection and detection of a light pattern) is operational, such that the pixels which do not receive part of the projected pattern can form an image from the received light.

While the pattern-reflection based range sensing provides a depth map containing 3-dimensional information only at the points illuminated by the projected pattern of laser light, the 2D images captured in-between provide a visual snapshot of the entire scenery. The depth map can be registered to the 2D images, and depth information can be obtained for every pixel in the 2D images by interpolating the depth map values. As the 2D images and the 3D information are obtained from the same sensor, there is no parallax between the different images, which facilitates the registration.

Preferably, the interpolation of the depth map values is assisted by the pixel values in the 2D images. Thus, for example, an area between different depth map values which corresponds to a regular luminance or color gradient in the 2D image, may be interpolated in the depth dimension by linear interpolation. An area between different depth map values which includes an abrupt step in the luminance or color value, may be interpolated by a stepwise constant depth value, with the step in the depth value is made to coincide with the step in the luminance or color value.

The combined 2D/3D image combines more information about the surroundings than either of the sources taken separately. A machine vision system may be supplied with the combined 2D/3D image to detect relevant features in the environment, such as pedestrians, vehicles, fixed objects, debris, any unevenness in the road surface, and the like.

Figure 5:
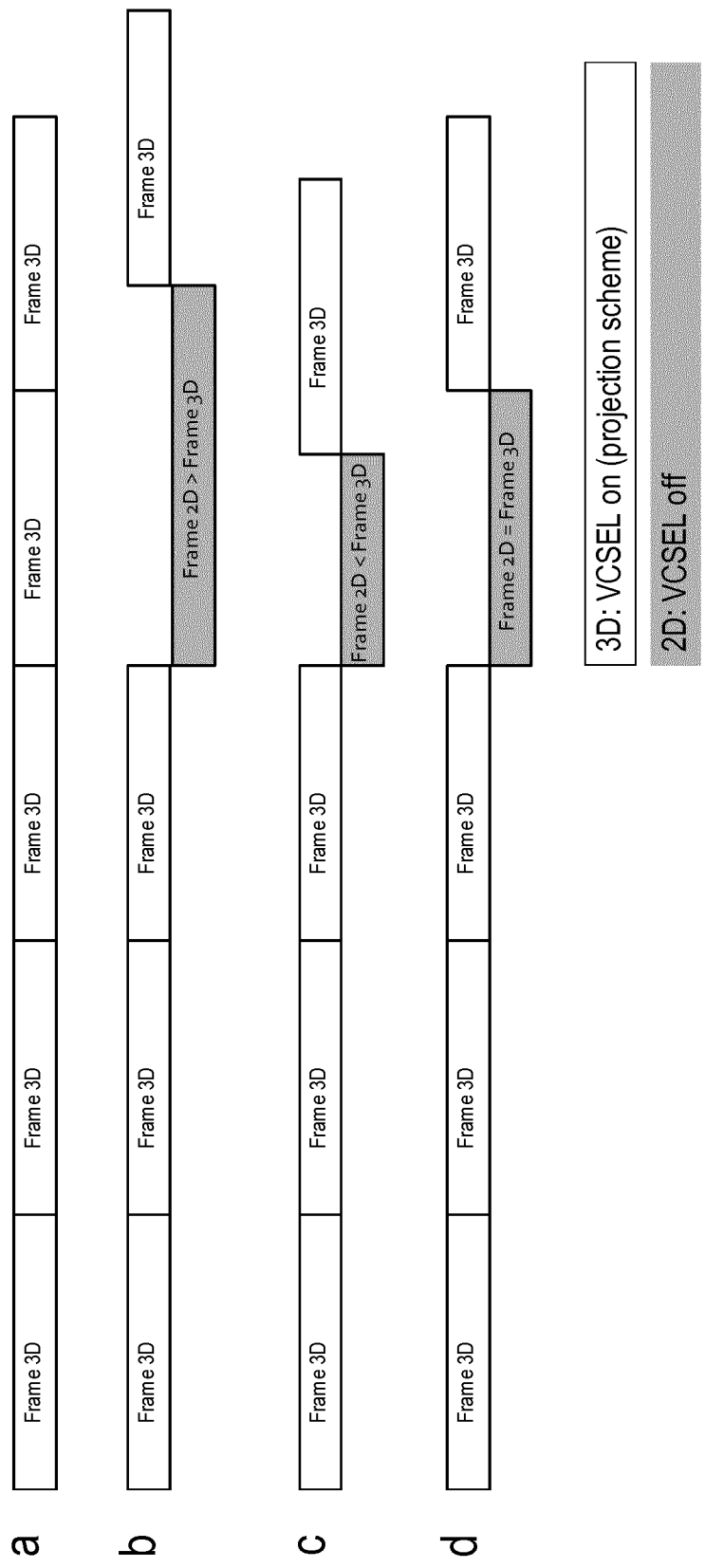
FIG. 5 presents several timing diagrams that can be used in embodiments of the present invention.

The 2D images are preferably captured in timeslots occurring between frames, e.g. between sequences of pulses. Exemplary timing diagrams are shown in FIG. 5. In diagram a (not according to the invention), 5 consecutive frames (each representing a sequence of pulses, for example a sequence 30 of FIG. 2) are all used for 3D range sensing. In diagram d, one frame of the first four frames is replaced by a 2D image capturing timeslot, of the exact same duration as the remaining frames; hence, the overall cadence of the frames remains the same, but only 75% of the frame time slots are used for range sensing (the skilled person will appreciate that this figure may be varied according to the requirements of the application; the relative time reserved for range sensing may for example be 10%, 20%, 25%, 33%, 40%, 50%, 60%, 67%, 75%, 80%, etc.). In diagrams b and c, the time used for 2D image capturing is made longer and shorter than the range sensing frames, respectively.

Generally, the time used for 2D image capturing may be selected in function of the desired exposure time, which must be sufficiently long to accumulate a sufficient amount of light in the pixels and sufficiently short to avoid motion blur (when the sensor and/or objects in the surroundings are in motion). The time slot used for 2D image capturing may also be extended to allow consecutive capturing of light in different wavelength bands (e.g., red, green, and blue light, to generate an RGB image), as explained below with reference to FIG. 7, diagram b.

As explained in great detail in the aforementioned patent applications WO 2015/004213 A1 and EP 15 191 288.8, several measures must be taken to filter out ambient light (in particular, sunlight) from the signal that reaches the sensor, such that the light that reaches the sensor is substantially limited to the desired reflection of the projected light pattern, in order to ensure accurate and long-range distance sensing. These measures include the use of a narrow bandpass filter, and optics that guide the incoming reflected light on a path that is substantially perpendicular to the narrow bandpass filter.

The measures required to optimize the range-sensing capabilities limit the usefulness of the pixel array as a 2D image camera. As the sensors is mounted on a vehicle, which, when in use, is normally moving, any increase of the exposure time to increase the total amount of light captured in a single exposure is limited by the acceptable amount of motion blur—in practice, this is a severe limitation.

In view of these negative effects, the inventors have found that the following optional features lead to better performance in the 2D image capturing.

A first solution consists of using a bandpass filter at the sensor side which can be electronically or electromechanically controlled to be active in synchronization with the pulse sequence and inactive at the points in time when the 2D images are captured.

A second solution consists of providing the system with illumination means configured to project a bundle of light onto the surroundings at the points in time that do not coincide with the sequence of pulses. Such illumination means may provide a flash of illumination, as is often done in conventional photography in low light conditions. The projection means 210 and the illumination means may share a common light source, in particular a VCSEL array. This ensures that a "flash" can be emitted in the same wavelength band for which the narrow bandpass filter is optimized, thus maximizing the amount of light that will reach the pixel array. If the common light source is VCSEL array, the illumination means may further comprise an actively steered diffuser, configured to be activated at the points in time at which the 2D images are taken (which do not coincide with the sequence of pulses), so as to diffuse light originating from the VCSEL array to form the desired bundle of light (instead of a series of spots). The illumination means may also be integrated with the headlight assembly, whereby the light source must be chosen such that it provides sufficient light power in the part of the spectrum that can pass through the narrow bandpass filter at the sensor side.

In view of the above considerations, one particularly advantageous embodiment of the system according to the present invention operates according to the time-of-flight based principle described above, whereby a VCSEL array is provided to project a pulsed pattern of discrete spots onto the scenery to be characterized, the reflections of which are detected by a CMOS-based sensor array equipped with a narrow bandpass filter configured to permit substantially only the wavelength emitted by the VCSEL array to pass. A separate flash light emitting a bundle of light of the same wavelength (typically in a narrow wavelength range around 860 nm) is provided to illuminate the scenery at the moments when the 2D images are to be captured—by design, the light emitted by the flash light will also be able to pass through the narrow passband filter at the detector. Preferably, four out of every five time slots are used to project/detect ranging frames, and the remaining one out of every five time slots is used to capture 2D images.

Figure 6:
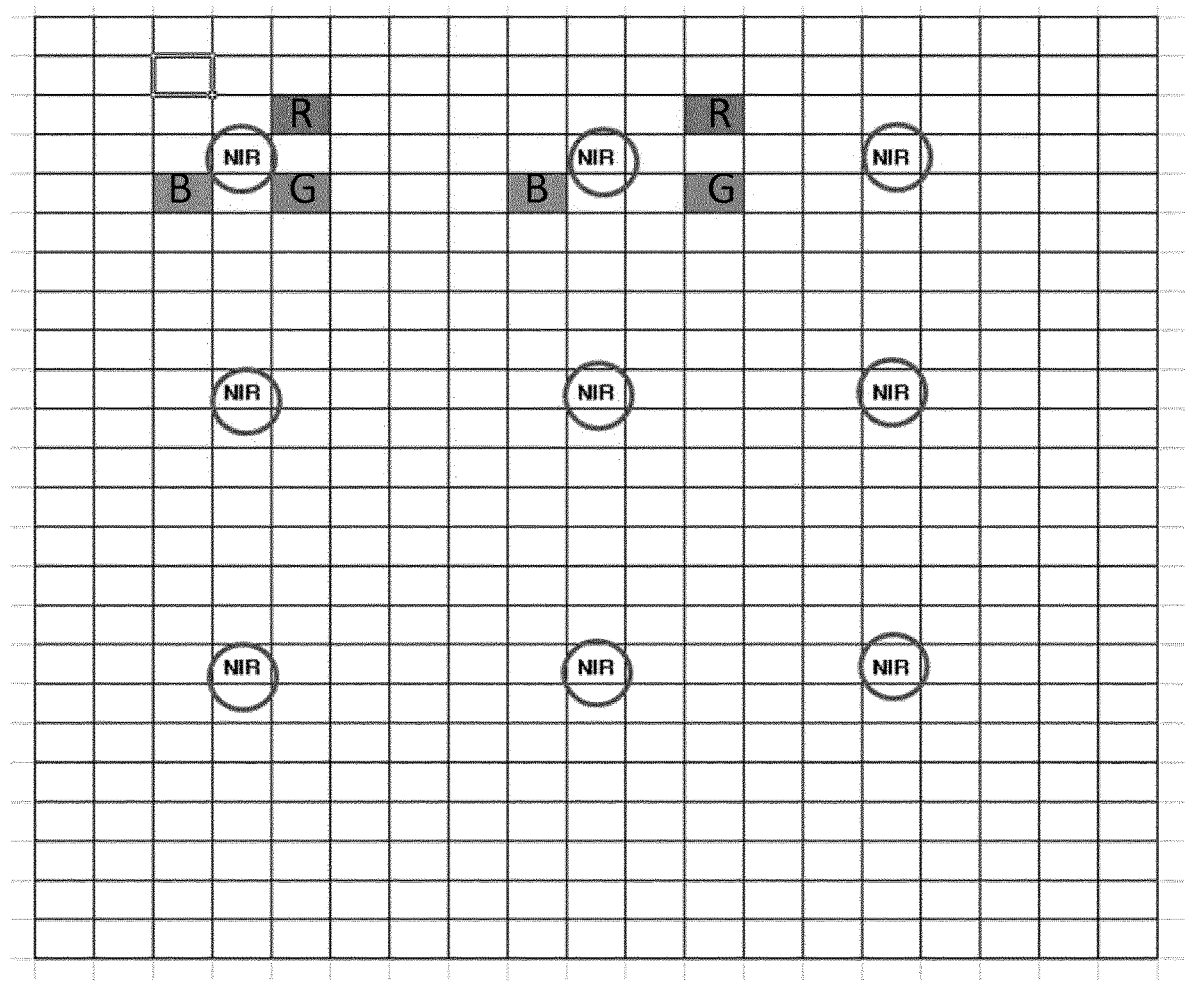
FIG. 6 schematically illustrate a pixel arrangement for use in an embodiment of the system according to the present invention.

In embodiments of the present invention, different pixels of the plurality of pixels of the detector 220 are provided with different filters allowing light in different wavelength bands to reach the different pixels at the points in time. This is schematically illustrated in FIG. 6, where a pixel array is shown with different pixels (or different wells of a pixel), provided with respective filters for near infrared (NIR) light, red light, green light, and blue light.

Figure 7:
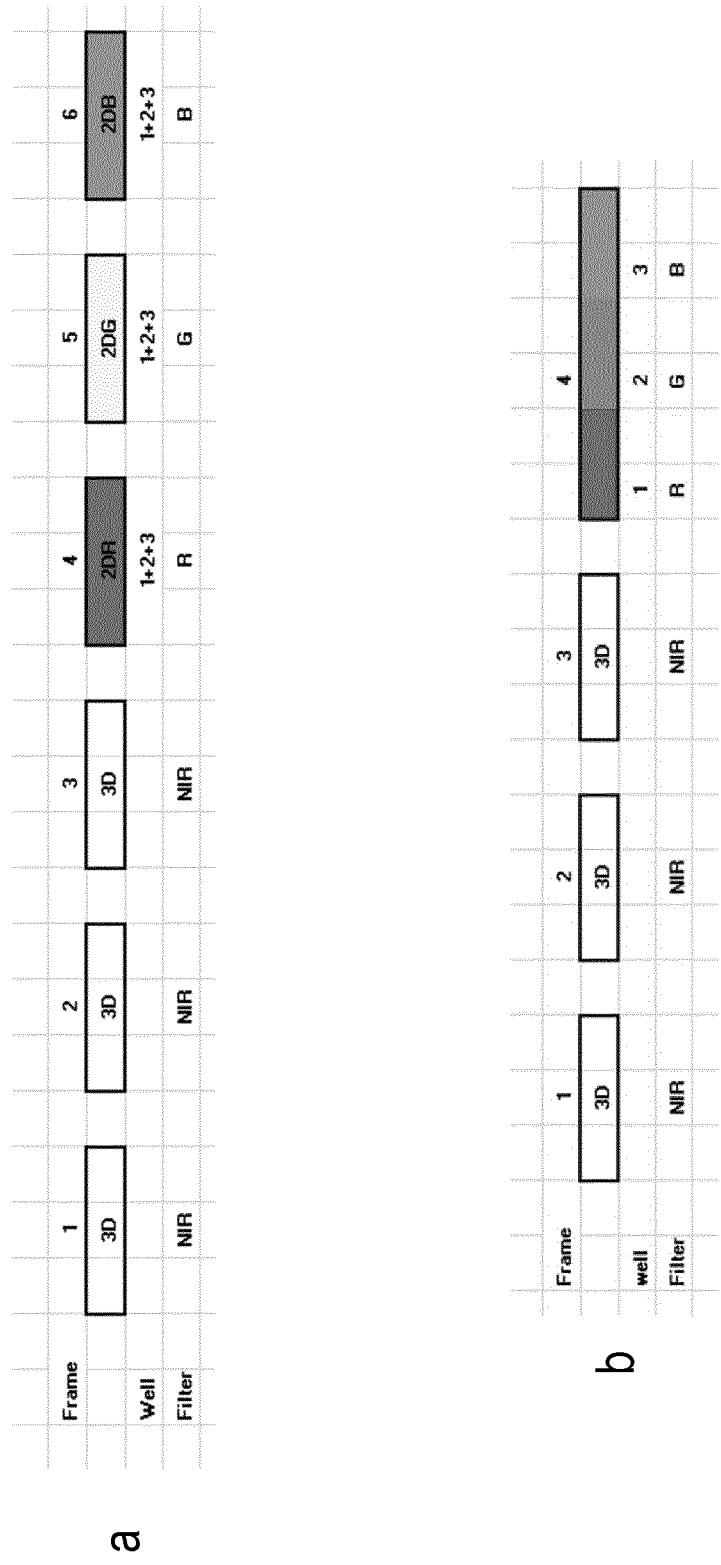
FIG. 7 schematically illustrate timing diagrams that can be used in embodiments of the present invention.

In other embodiments of the present invention, the plurality of pixels of the detector 220 are provided with a time-dependent filter allowing light in different wavelength bands to reach the plurality of pixels at different ones of the points in time. This is schematically shown in FIG. 7, diagram a, where separate time slots are provided to capture red, green, and blue light; and in FIG. 7, diagram b, where the time slot is extended to allow for consecutive capturing of red, green, and blue light in consecutive parts of the same time slot.

These sets of embodiments allow an RGB 2D image to be captured, which is suitable for rendering on a color display.

The present invention also pertains to a vehicle (in particular a road vehicle or a railway vehicle) comprising the system according to any of the preceding claims arranged so as to characterize an area surrounding the vehicle.

While the invention has been described hereinabove with reference to separate system and method embodiments, this was done for clarifying purposes only. The skilled person will appreciate that features described in connection with the system or the method alone, can also be applied to the method or the system, respectively, with the same technical effects and advantages. Furthermore, the scope of the invention is not limited to these embodiments, but is defined by the accompanying claims.

The invention claimed is:

1. A system for characterizing surroundings of a vehicle, the system comprising:
 projection means arranged for projecting a pattern of laser light towards said surroundings in a sequence of pulses, said pattern of laser light comprising a pattern of discrete spots;
 a detector comprising a plurality of pixels, said detector being configured for detecting light representing said pattern of laser light as reflected by said surroundings in synchronization with said sequence of pulses; and
 processing means configured to calculate distances to objects in said surroundings as a function of first and second exposure values generated by said pixels in response to said detected light;
 wherein each pulse of said sequence of pulses has associated with it a first predetermined time window and a second predetermined time window, said second predetermined time window occurring after said first predetermined time window;
 wherein said pixels are configured to generate said first exposure value by accumulating in a first well of the respective pixels, for all of the pulses of said sequence, first amounts of electrical charge representative of first amounts of light reflected by said objects during respective first predetermined time windows and
 wherein said pixels are further configured to generate said second exposure value by accumulating in a second well of the respective pixels, for all of the pulses of said sequence, second amounts of electrical charge representative of second amounts of light reflected by said objects during respective second predetermined time windows;
 wherein said detector is further configured for detecting light forming a two-dimensional image of said surroundings at points in time that do not coincide with said sequence of pulses.

2. The system according to claim 1, wherein said processing means are adapted to determine said distances by determining a displacement of features of said detected light representing said pattern of laser light as reflected by said surroundings with reference to predetermined feature positions.

3. The system according to claim 2, comprising illumination means configured to project a bundle of light onto said surroundings at said points in time that do not coincide with said sequence of pulses.

4. The system according to claim 3, wherein said projection means and said illumination means share a common light source.

5. The system according to claim 4, wherein said common light source comprises a VCSEL array, and wherein said illumination means further comprises an actively steered diffuser, configured to be activated at said points in time that do not coincide with said sequence of pulses, so as to diffuse light originating from said VCSEL array to form said bundle.

6. The system according to claim 5, wherein said plurality of pixels of said detector are provided with a time-dependent filter allowing light in different wavelength bands to reach said plurality of pixels at different ones of said points in time.

7. The system according to claim 6, wherein different pixels of said plurality of pixels of said detector are provided with different filters allowing light in different wavelength bands to reach said different pixels at said points in time.

8. A vehicle comprising the system according to claim 7 arranged so as to characterize an area surrounding said vehicle.

9. The system according to claim 1, comprising illumination means configured to project a bundle of light onto said surroundings at said points in time that do not coincide with said sequence of pulses.

10. The system according to claim 9, wherein said projection means and said illumination means share a common light source.

11. The system according to claim 10, wherein said common light source comprises a VCSEL array, and wherein said illumination means further comprises an actively steered diffuser, configured to be activated at said points in time that do not coincide with said sequence of pulses, so as to diffuse light originating from said VCSEL array to form said bundle.

12. The system according to claim 1, wherein said plurality of pixels of said detector are provided with a time-dependent filter allowing light in different wavelength bands to reach said plurality of pixels at different ones of said points in time.

13. The system according to claim 1, wherein different pixels of said plurality of pixels of said detector are provided with different filters allowing light in different wavelength bands to reach said different pixels at said points in time.

14. A vehicle comprising the system according to claim 1 arranged so as to characterize an area surrounding said vehicle.

15. The system according to claim 2, comprising illumination means configured to project a bundle of light onto said surroundings at said points in time that do not coincide with said sequence of pulses.

16. The system according to claim 15, wherein said projection means and said illumination means share a common light source.

17. The system according to claim 16, wherein said common light source comprises a VCSEL array, and wherein said illumination means further comprises an actively steered diffuser, configured to be activated at said points in time that do not coincide with said sequence of pulses, so as to diffuse light originating from said VCSEL array to form said bundle.

18. The system according to claim 2, wherein said plurality of pixels of said detector are provided with a time-dependent filter allowing light in different wavelength bands to reach said plurality of pixels at different ones of said points in time.

19. The system according to claim 2, wherein different pixels of said plurality of pixels of said detector are provided with different filters allowing light in different wavelength bands to reach said different pixels at said points in time.

* * * * *